United States Patent [19]
Kosmoski et al.

[11] Patent Number: 5,833,186
[45] Date of Patent: Nov. 10, 1998

[54] COMBINATION SPEAKER HOUSING AND VIDEO MONITOR BRACKET

[75] Inventors: Jeffrey P. Kosmoski; David Knaub, both of Portland, Oreg.

[73] Assignee: Labtec Enterprises, Inc., Vancouver, Wash.

[21] Appl. No.: 588,367

[22] Filed: Jan. 18, 1996

[51] Int. Cl.$^6$ .................................................. A47B 96/06
[52] U.S. Cl. ...................... 248/221.11; 248/687; 381/205
[58] Field of Search .............................. 248/221.11, 687, 248/122.1, 222.12, 298.1, 354.4, 221.12, 442.2, 633; 381/205, 87, 88, 188; 403/316, 393, 353; 5/299

[56] References Cited

U.S. PATENT DOCUMENTS

| | | | |
|---|---|---|---|
| 1,673,704 | 6/1928 | Palmer et al. ........................ 248/298.1 |
| 3,392,848 | 7/1968 | McConnell et al. ................ 248/221.12 |
| 3,976,162 | 8/1976 | Cummings ............................... 381/205 |
| 4,231,378 | 11/1980 | Stevens ................................ 131/170 R |
| 4,475,226 | 10/1984 | Greenberg ............................... 381/205 |
| 4,619,429 | 10/1986 | Mazza .................................... 248/442.2 |
| 4,993,074 | 2/1991 | Carroll .................................... 381/205 |
| 5,282,251 | 1/1994 | Petersen .................................. 381/205 |

Primary Examiner—Ramon O. Ramirez
Assistant Examiner—Willie Berry, Jr.
Attorney, Agent, or Firm—Hancock Meininger & Porter LLP

[57] ABSTRACT

A combination loudspeaker housing and bracket is disclosed which is universally adaptable to any size or shape of a video monitor, and which mounts speakers outboard of the monitor.

29 Claims, 4 Drawing Sheets

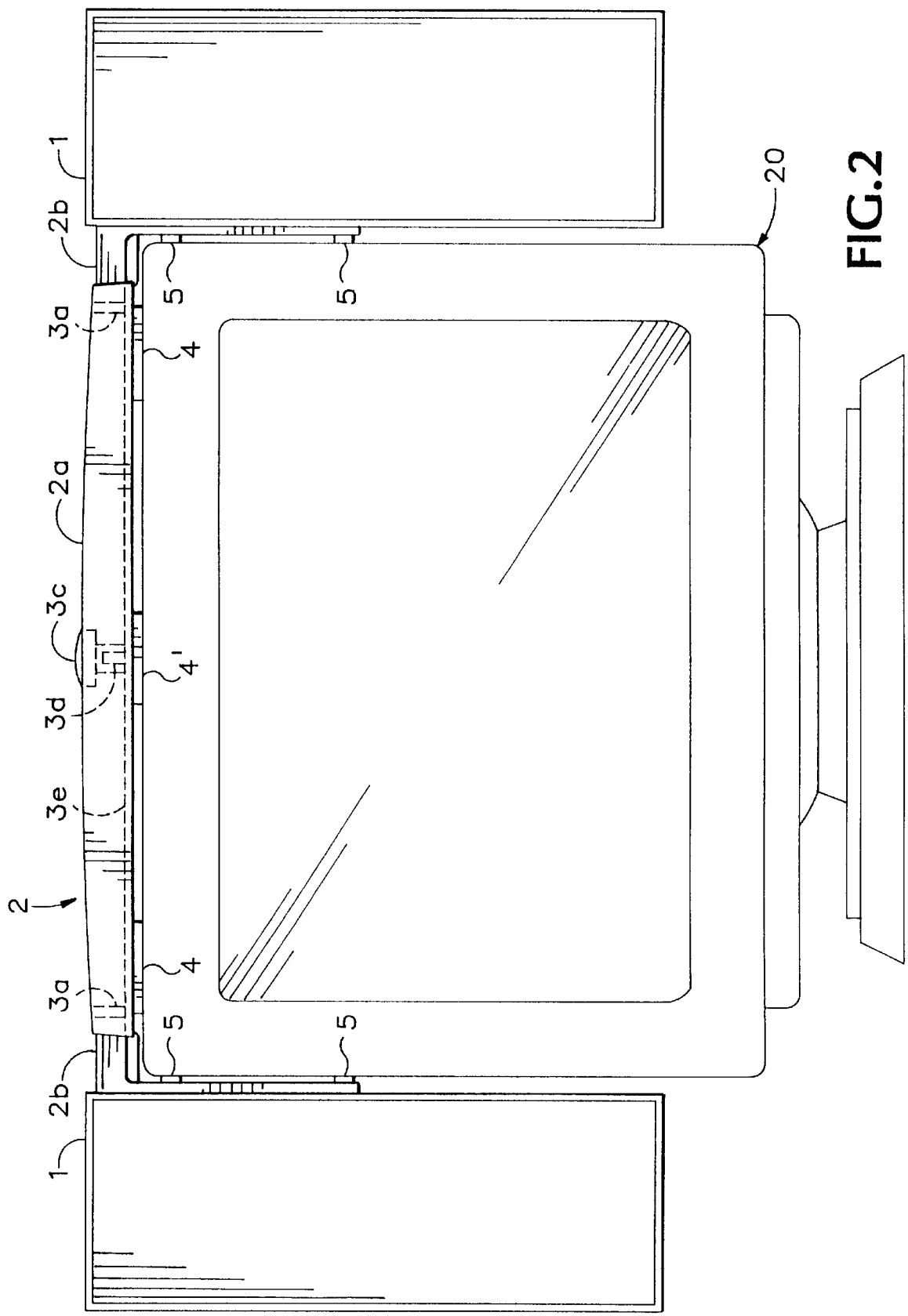

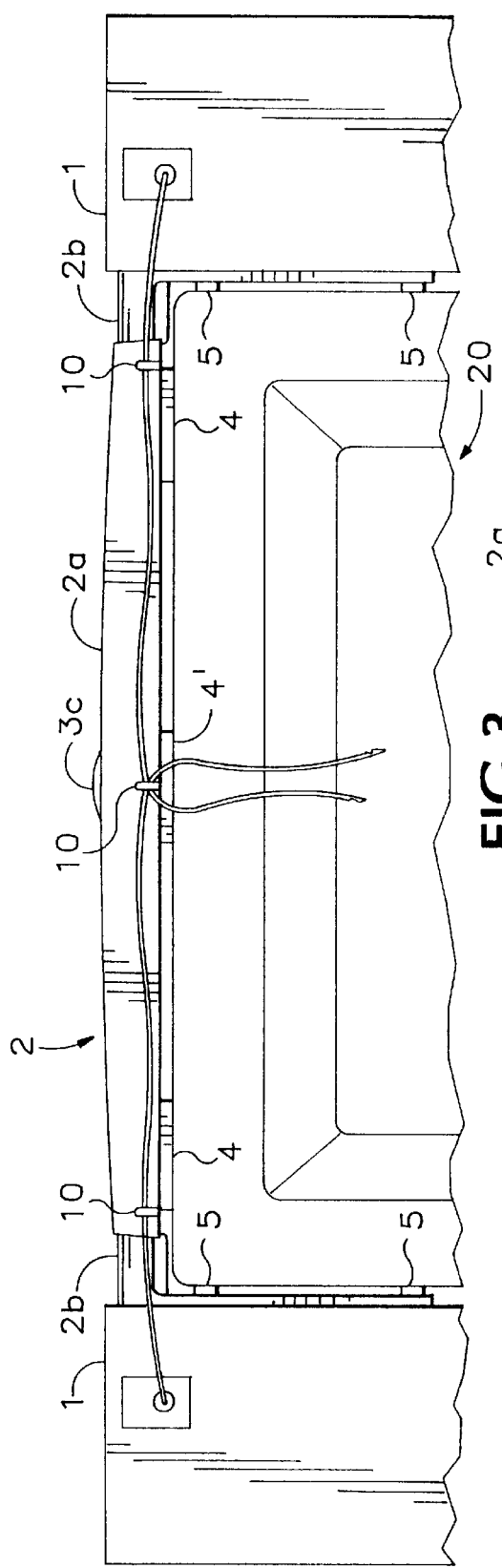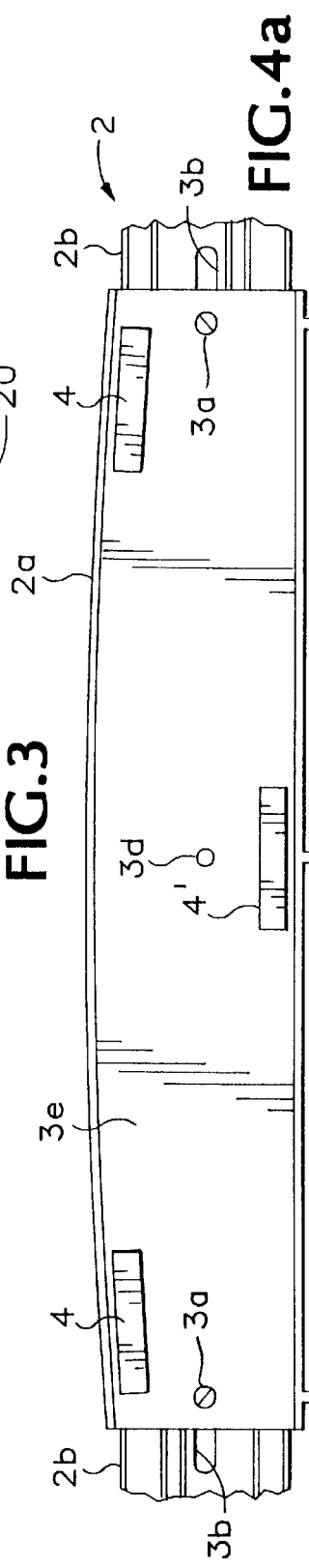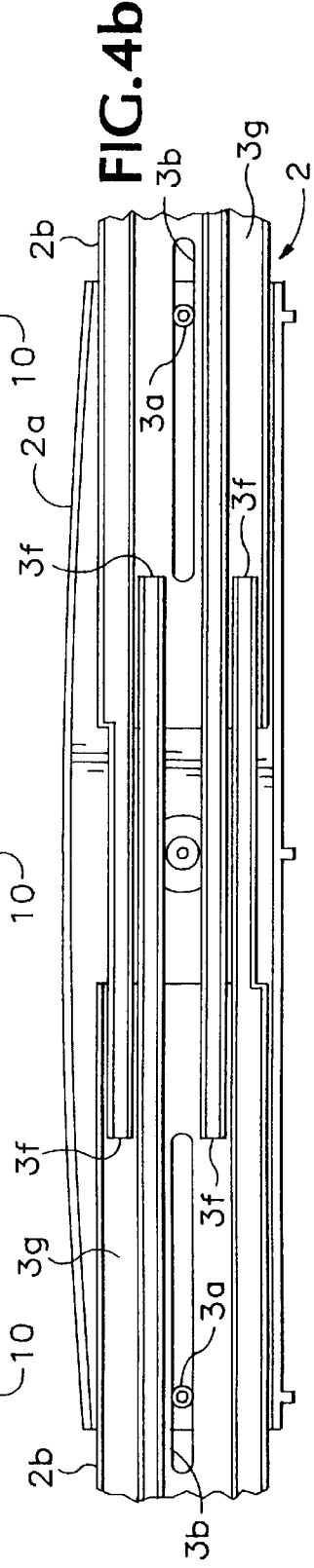

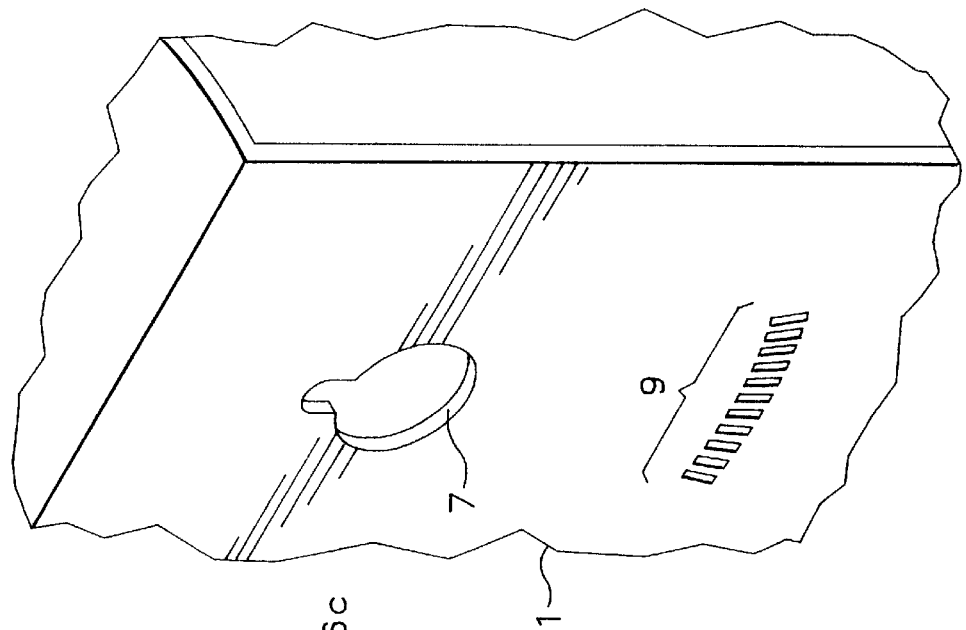
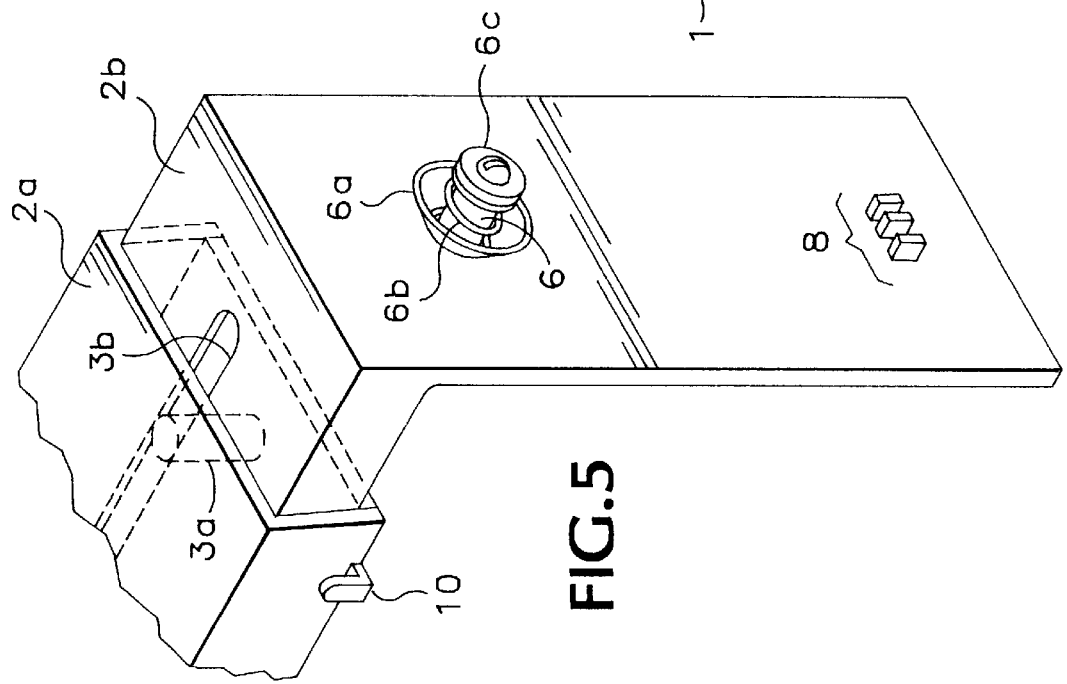

COMBINATION SPEAKER HOUSING AND VIDEO MONITOR BRACKET

BACKGROUND OF THE INVENTION

This invention relates to improvements in computer-related equipment.

With the advent of high quality stereophonic audio to accompany the video displays on television screens and computer monitors, there has developed a need for a convenient and universally adjustable means for mounting loudspeakers in close proximity to television and monitor screens. The present invention, which is summarized and described in detail below, meets this need.

SUMMARY OF THE INVENTION

The invention comprises an adjustable and universally fitting bracket for mounting loudspeakers outboard of virtually any sized or shaped video monitor, in combination with a loudspeaker housing adapted for adjustable angular engagement with the bracket.

BRIEF DESCRIPTION OF THE DRAWINGS

FIG. 2 is a front view of the present invention showing loudspeaker housings mounted outboard of a video monitor.

FIG 3 is a rear view of the present invention showing loudspeaker housings mounted outboard of a video monitor.

FIGS. 4a and 4b are views of the underside of the bracket of the present invention.

FIG. 5 is a perspective view of one wall of an exemplary loudspeaker housing showing means therein adapted for engagement with the bracket of the present invention.

FIG. 6 is a perspective view of a portion of the bracket of the present invention showing means thereon adapted for engagement with the loudspeaker housing.

DETAILED DESCRIPTION OF PREFERRED EMBODIMENTS

Figure 1:
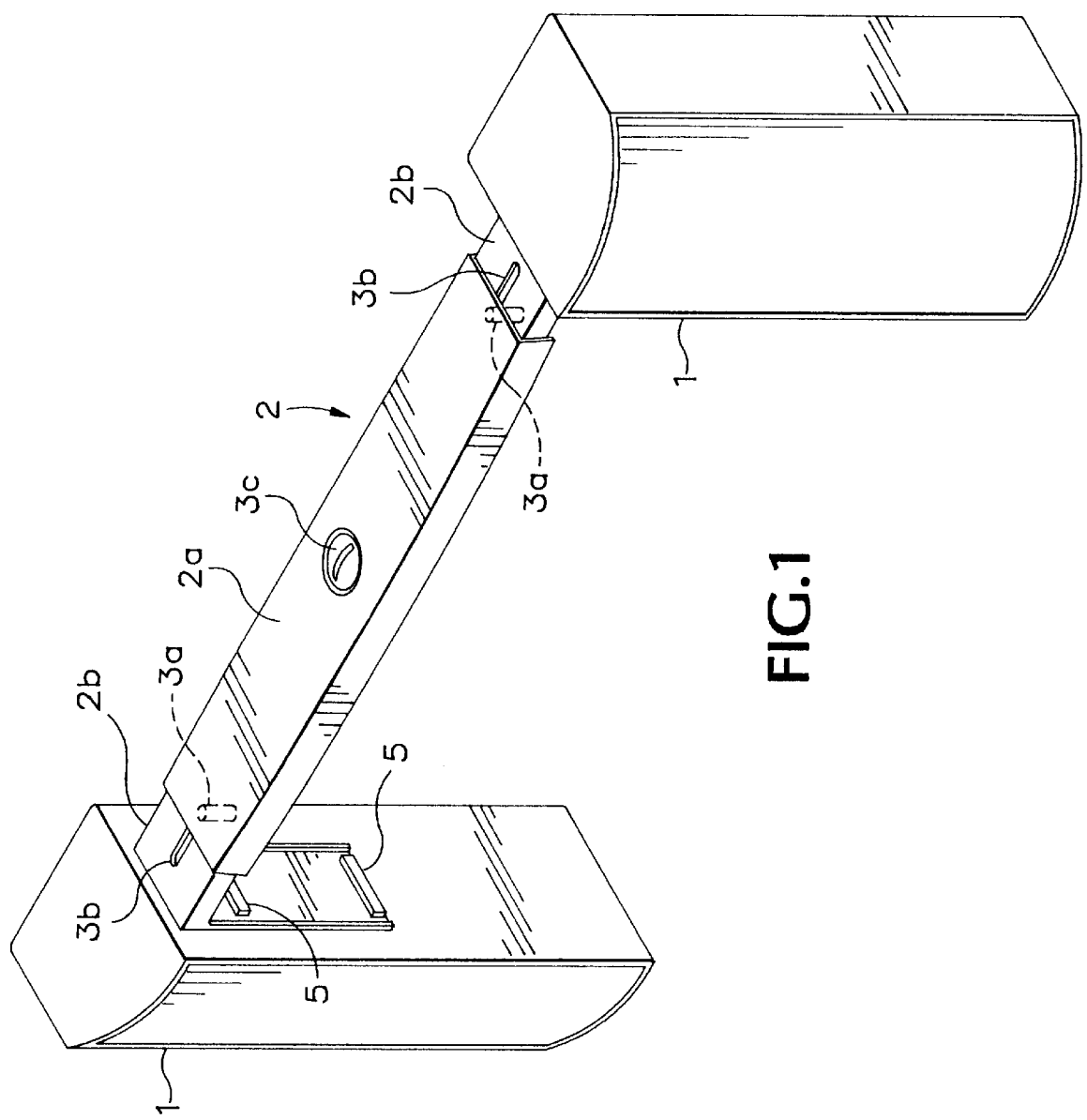
FIG. 1 is a perspective view of an exemplary combination speaker housing and mounting bracket of the present invention.

Referring to the drawings, wherein like numerals refer to the same elements, FIG. 1 shows speaker housings 1 attached to a bracket of the present invention, comprising a bridging member 2a having slidably adjustable L-shaped extensions 2b which are slidable with respect to each other and with respect to bridging member 2a by means of slot-engaging guides 3a that engage elongate slots 3b. L-shaped extensions 2b are preferably fabricated with ribbed rails 3f that slidably engage corresponding channels 3g, those two elements enabling proper, smooth and secure alignment of the extensions 2b with respect to each other.

The extensions 2b are held in fixed relation to each other by threaded female nut 3c which engages threaded bracket plate pin 3d to pull bracket plate 3e upwardly to impinge upon the extensions, best seen in the top portion of FIG. 2.

FIG. 2 is a frontal view of a computer monitor 20 showing bracket 2 with speaker housings 1 attached outrigger style to L-shaped extensions 2b the bracket engaging the top and sides of the monitor via resilient pads 4, 4' and 5.

FIG. 3 is a rear view of the bracket and speakers mounted on the monitor, and showing speaker lead wire management harnesses 10 on the back side of bracket 2.

FIG. 4a is a view of the underside of the bracket 2 showing resilient pads 4, 4' and 4 in a spaced and balanced relationship to each other.

FIG. 4b is a view of the underside of the bracket 2 with the bracket plate 3e removed to further illustrate the arrangement of the guides 3a, slots 3b, ribs 3f and channels 3g.

FIGS. 5 and 6 show the mating relationship between the housing 1 and bracket extension 2b whereby post 6 engages elongate slotted hole 7 and pegs 8 engage corresponding slots 9, both pegs and slots being radially oriented in relation to post 6 and elongate slotted hole 7, respectively. An annular collar-like keeper 6a surrounds post 6 and is urged toward the base of the post by spring 6b, which in turn is secured to the post by a screw and flange combination 6c.

Because the L-shaped extensions 2b of the bracket are horizontally slidable with respect to each other, the bracket is universally adjustable to fit virtually any width TV set or video monitor. Similarly, the provision of at least one resilient pad on the underside of the bridging member 2a assures a snug, vibration-free fit of the bracket to the top of the TV set or monitor that automatically conforms to the curvature of the top of the TV set or monitor. The provision of at least one resilient pad on the inside of each downwardly extending leg of the L-shaped extensions 2b further assures a snug and vibration-free fit of the bracket to the TV set or monitor. Once the width of the bracket is slidably adjusted so that downwardly extending legs of L-shaped extensions 2b engage the sides of the TV set or monitor, threaded female nut 3c is tightened to engage threaded bracket plate pin 3d so as to snug bracket plate 3e up into secure contact with ribbed rails 3f and channels 3g of the L-shaped extensions, thereby fixing the width of the bracket to the desired size.

A loudspeaker in speaker housing 1 is secured to the bracket by first guiding the larger portion of elongate slotted hole 7 over post 6 and keeper 6a, then urging the smaller or slotted portion of elongate slotted hole 7 at generally right angles to post 6; the slight taper of keeper 6a guides the slotted part of elongate hole 7 to the base of post 6, while spring 6b yields sufficiently to allow locking engagement between the slot and the base of post 6, with keeper 6a being biased against the inside wall of speaker housing 1. Speaker housing 1 is then pivoted about post 6 until slotted holes 9 are in the desired alignment with pegs 8, whereupon holes 9 and pegs 8 are engaged.

To allow for an adjustable orientation of the front of the loudspeaker(s) in relation to the plane of the bridging member (determined by the slope of the top of the TV set or monitor), pegs 8 and slots 9 are preferably in a radial array relative to post 6 and elongate hole 7, respectively. Such an orientation of pegs 8 and slots 9 allows loudspeakers in speaker housings 1 to be rotated incrementally on posts 6 to the desired plane so that the loudspeakers may be oriented in the same plane as the screen of the TV set or monitor, or at an angle with respect thereto, such as in a perfectly vertical plane.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A combination loudspeaker housing and video monitor bracket therefor comprising:

(a) at least one loudspeaker housing having an elongate hole in at least one wall of said housing and at least one receptacle spaced apart from said elongate hole; and (b) a video monitor bracket comprising:
  (i) a bridging member;
  (ii) two L-shaped members having distal downwardly oriented extensions located at distal ends of the bracket, the L-shaped members further including lateral extensions arranged substantially horizontally and extending toward each other relative to the downwardly oriented extensions, said L-shaped members being slidably adjustable relative to each other and relative to said bridging member, said downwardly oriented extensions each being provided with a post and at least one peg spaced apart from said post, said post and said at least one peg being adapted for engagement with said elongate hole and at least one receptacle of said housing, respectively whereby said bracket can support said loudspeaker housing on a device such as a video display device at a predetermined orientation.

2. The combination housing and bracket of claim 1 wherein said housing has a multiplicity of receptacles radially arranged in relation to said elongate hole and said bracket has a multiplicity of pegs radially arranged in relation to said post.

3. The combination housing and bracket of claim 1 wherein said post of said bracket has an annular keeper adapted for engagement with the slot of said elongate hole.

4. The combination housing and bracket of claim 3 wherein said annular keeper is spring-loaded so as to urge said keeper toward the base of said post.

5. The combination housing and bracket of claim 1 wherein said elongate hole is a slotted hole.

6. The combination housing and bracket of claim 1 wherein said bridging member is provided with at least one resilient pad for engaging the top of a video monitor.

7. The combination housing and bracket of claim 6 wherein said bridging member is provided with a multiplicity of resilient pads in a spaced apart relationship to each other.

8. The combination housing and bracket of claim 7 wherein said bridging member is provided with three resilient pads whereby one of said pads is located at approximately the center of said bridging member near one edge thereof and the other two of said pads are located outboard of said one pad and near the other edge thereof.

9. The combination housing and bracket of claim 1 wherein said extensions of said L-shaped members are provided with at least one resilient pad for engaging the sides of a video monitor.

10. The combination housing and bracket of claim 1 wherein said bridging member is provided with means for harnessing electrical leads to said at least one loudspeaker housing.

11. A video display support bracket for supporting two components on a video display device, comprising:
  (a) a bridge member having a cable guide for supporting a cable;
  (b) a first extension member having a first portion, and a second portion coupled to the first portion; and
  (c) a second extension member having a third portion, and a fourth portion coupled to the third portion;
  (d) wherein the first portion is sidably coupled to the bridge member and the third portion is slidably coupled to the bridge member, and the second portion is adjustably spaced apart from the fourth portion so as to permit the bracket to be located on a video display device wherein the second and fourth portions provide a location for coupling to components to be located proximate the display device.

12. The bracket of claim 11 wherein the bridge includes a top surface and a bottom surface and the some part of the first and third portions are located between the top and bottom surfaces.

13. The bracket of claim 11 wherein the bridge member includes a fastener to fasten the bridge member to the first and second extension members.

14. The bracket of claim 11 wherein the bridge member includes a top and a bottom and further comprising a fastener that constricts the top and bottom, and wherein some part of the first and second extension members are located between the top and bottom and operation of the fastener constricts the top and bottom onto the first and second extension members.

15. The bracket of claim 11 wherein the second and fourth portions have coupler devices and positioning devices so that components can couple to the second and fourth elongate portions by the coupler devices and be held in position by the positioning devices.

16. A combination of loudspeaker housings and bracket, comprising:
  (a) two loudspeaker housings, each housing having a first coupler device and a first positioning device; and
  (b) a bracket having a first leg adjustably coupled to a second leg by a bridge member, the first and second legs each having a second coupler device selectively coupled to the first coupler device for coupling one loudspeaker housing to a respective leg of the bracket and the first and second legs each having a second positioning device operable with the first positioning device to orient the respective loudspeaker housing relative to the bracket.

17. The combination of claim 16 wherein the second coupler device is a post and the first coupler device is an aperture for receiving the post.

18. The combination of claim 16 wherein the first coupler device is a post and the second coupler device is an aperture for receiving the post.

19. The combination of claim 16 wherein the first positioning device is a peg and the second positioning device is a receptacle for receiving the peg.

20. The combination of claim 16 wherein the second positioning device is a peg and the first positioning device is a receptacle for receiving the peg.

21. The combination of claim 16 wherein the first coupler device is an aperture and the second coupler device is a post having a biased annular collar for urging the housing against the bracket when the housing is coupled to the bracket.

22. The combination of claim 16 wherein the bridge member includes a top and a bottom, and a portion of the first leg is located between the top and bottom and a portion of the second leg is located between the top and bottom.

23. The combination of claim 16 wherein the bridge member includes a top and a bottom and a fastener, and a portion of the first leg is located between the top and bottom and a portion of the second leg is located between the top and bottom and operation of the fastener fixedly couples the first and second legs to the bridge member.

24. A multimedia loudspeaker apparatus for locating a pair of loudspeakers onto a video display device, comprising:
  (a) a bracket having an elongate, proximal bight portion and a distal member at each of two opposed ends of the bight portion, wherein the bight portion has a top surface and a bottom surface, each distal member having an inner surface forming an angle relative to the bottom surface of the bight portion and each distal member having an outer surface, each outer surface having a first coupler device and a first positioning device; and (b) two loudspeaker housings, each housing having a second coupler device for selectively coupling to one first coupler device of the bracket and each housing further having a second positioning device for engagement with one first positioning device for positioning the respective loudspeaker relative to the bracket.

25. The apparatus of claim 24 further comprising a fastener for fixedly coupling the distal members along the bight portion.

26. The apparatus of claim 24 wherein the first coupler device comprises a post having a biased collar and the second coupler device comprises an aperture that receives the post and collar so as to urge the speaker housing against the bracket.

27. The apparatus of claim 24 wherein the first coupler device comprises an aperture and the second coupler device comprises a post having a biased collar and the post and collar are received in the aperture and so as the urge the speaker housing against the bracket.

28. The apparatus of claim 24 wherein the first positioning device comprises a peg and the second positioning device comprises a receptacle for receiving the peg so as to inhibit the housings from sifting position when the housings are coupled to the bracket.

29. The apparatus of claim 24 wherein the first coupler device comprises a post having a biased collar and the second coupler device comprises an aperture that receives the post and biased collar so as to urge the speaker housing against the bracket and wherein the first positioning device comprises a peg and the second positioning device comprises a receptacle for receiving the peg so as to inhibit the housings from sifting position when the housings are coupled to the bracket.

* * * * *